United States Patent
Jeong et al.

(10) Patent No.: US 10,734,694 B2
(45) Date of Patent: Aug. 4, 2020

(54) SECONDARY BATTERY

(71) Applicant: LG Chem, Ltd., Seoul (KR)

(72) Inventors: Min Gi Jeong, Daejeon (KR); Ik Su Kang, Daejeon (KR); Sang Uck Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/308,236

(22) PCT Filed: Oct. 30, 2017

(86) PCT No.: PCT/KR2017/012074
§ 371 (c)(1),
(2) Date: Dec. 7, 2018

(87) PCT Pub. No.: WO2018/080257
PCT Pub. Date: May 3, 2018

(65) Prior Publication Data
US 2019/0267685 A1     Aug. 29, 2019

(30) Foreign Application Priority Data
Oct. 31, 2016   (KR) .................. 10-2016-0143355

(51) Int. Cl.
*H01M 10/658* (2014.01)
*A62C 2/06* (2006.01)
*H01M 2/10* (2006.01)
*H01M 2/34* (2006.01)

(52) U.S. Cl.
CPC .......... *H01M 10/658* (2015.04); *A62C 2/065* (2013.01); *H01M 2/1094* (2013.01); *H01M 2/34* (2013.01)

(58) Field of Classification Search
None
See application file for complete search history.

(56) References Cited

U.S. PATENT DOCUMENTS

| | | |
|---|---|---|
| 2008/0020270 A1 | 1/2008 | Park et al. |
| 2016/0043368 A1 | 2/2016 | Kim |
| 2016/0365553 A1 | 12/2016 | Kountz et al. |

FOREIGN PATENT DOCUMENTS

| | | |
|---|---|---|
| KR | 100509747 B1 | 8/2005 |
| KR | 20080007693 A | 1/2008 |
| KR | 20080066312 A | 7/2008 |

(Continued)

OTHER PUBLICATIONS

Kim et al. (KR 20120112177) (a raw machine translation) (Abstract) (Oct. 11, 2012) (Year: 2012).*

(Continued)

*Primary Examiner* — Carmen V Lyles-Irving
(74) *Attorney, Agent, or Firm* — Lerner, David, Littenberg, Krumholz & Mentlik, LLP

(57) ABSTRACT

The present invention relates to a secondary battery including: a can having an opening in which an electrode assembly and an electrolyte are accommodated; a cap assembly mounted on the opening of the can; and a safety assembly disposed between the electrode assembly and the cap assembly and including a first fire extinguishing member that is configured to be scattered into the electrolyte when the electrode assembly experiences an increase in temperature to suppress the increase in temperature of the electrode assembly.

11 Claims, 4 Drawing Sheets

(56) References Cited

FOREIGN PATENT DOCUMENTS

| KR | 100958649 B1 | 5/2010 |
| KR | 20120112177 A | 10/2012 |
| KR | 20120133203 A | 12/2012 |
| KR | 20150040494 A | 4/2015 |
| KR | 20160019251 A | 2/2016 |
| WO | 2012134202 A2 | 10/2012 |
| WO | 2016010722 A1 | 1/2016 |

OTHER PUBLICATIONS

Kim et al. (KR 20120112177) (a raw machine translation) (Detailed Description) (Oct. 11, 2012) (Year: 2012).*
Extended European Search Report including the Written Opinion for Application No. EP 17863496.0 dated Mar. 1, 2019.
Search report from International Application No. PCT/KR2017/012074, dated Feb. 6, 2018.

* cited by examiner

SECONDARY BATTERY

CROSS-REFERENCE TO RELATED APPLICATION

The present application is a national phase entry under 35 U.S.C. § 371 of International Application No. PCT/KR2017/012074, filed on Oct. 30, 2017, published in Korean, which claims priority from Korean Patent Application No. 10-2016-0143355, filed on Oct. 31, 2016, the disclosures of which are hereby incorporated herein by reference.

TECHNICAL FIELD

The present invention relates to a secondary battery, and more particularly, to a secondary battery that is capable of preventing heat generation, ignition, and explosion from occurring in the event of external short circuit or overcharging.

BACKGROUND ART

In general, secondary batteries refer to chargeable and dischargeable, unlike primary batteries that are not chargeable. The secondary batteries are being widely used in the high-tech electronic fields such as mobile phones, notebook computers, and camcorders.

However, the secondary battery may have a problem in which heat generation, ignition, and explosion occur while the secondary battery rapidly increases in temperature when external short circuit or overcharging occurs.

DISCLOSURE OF THE INVENTION

Technical Problem

The present invention has been made to solve the above problem, and an object of the present invention is to provide a secondary battery in which a fire extinguishing agent is provided in a can, in which an electrode assembly is accommodated, to suppress an increase in temperature of the electrode assembly by the fire extinguishing agent when external short circuit or overcharging occurs, thereby improving safety.

Technical Solution

To achieve the above-described objects, a secondary battery according to the present invention may include: a can having an opening in which an electrode assembly and an electrolyte are accommodated; a cap assembly mounted on the opening of the can; and a safety assembly disposed between the electrode assembly and the cap assembly and including a first fire extinguishing member that is scattered into the electrolyte when the electrode assembly increases in temperature to suppress the increase in temperature of the electrode assembly.

The fire extinguishing member may be provided with a plurality of capsulated fire-extinguishing grains containing a fire extinguishing liquid, and the capsulated fire-extinguishing grains may be melted when the electrode assembly increases in temperature so that the fire extinguishing liquid is scattered into the electrolyte.

The safety assembly may further include an insulation member, and the first fire extinguishing member may be installed on the insulation member so as to be scattered into the electrolyte when the electrode assembly increases in temperature.

The insulation member and the first fire extinguishing member may be vertically stacked to provide a two-layered structure.

The capsulated fire-extinguishing grains may be filled into holes or gaps provided in a surface of the insulation member to provide a structure in which the insulation member and the first fire extinguishing member are integrated with each other.

The fire extinguishing liquid 152a may have a component including perfluoroketone.

The can may include an accommodation part accommodating the electrode assembly and the electrolyte, a beading part supporting the cap assembly, and the opening on which the cap assembly is mounted, and the safety assembly may be disposed in the accommodation part and have an edge attached to a bottom surface of the beading part.

The safety assembly may further include a second fire extinguishing member disposed between the electrode assembly and a bottom surface of the can to suppress the increase in temperature of the electrode assembly while being scattered into the electrolyte when the electrode assembly increases in temperature, and the second fire extinguishing member may be provided with a plurality of capsulated fire-extinguishing grains containing a fire extinguishing liquid.

The plurality of capsulated fire-extinguishing grains that are the second fire extinguishing member may be attached to the bottom surface of the can by using an adhesive.

The safety assembly may further include a third fire extinguishing member disposed on an inner circumferential surface of the can to suppress the increase in temperature of the electrode assembly while being scattered into the electrolyte when the electrode assembly increases in temperature, and the third fire extinguishing member may be provided with a plurality of capsulated fire-extinguishing grains containing a fire extinguishing liquid.

The plurality of capsulated fire-extinguishing grains that are the second fire extinguishing member may be attached to the inner circumferential surface of the can by using an adhesive.

The insulation member may be made of a polyvinylchloride (PVC) or polypropylene (PP) material.

Advantageous Effects

The present invention has effects as follows.

First: the secondary battery according to the present invention may include a safety assembly including the insulation member and the first fire extinguishing member to suppress the increase in temperature of the electrode assembly and improve the safety.

Second: in the secondary battery according to the present invention, the first fire extinguishing member may be provided with the capsulated fire-extinguishing grains containing the fire extinguishing liquid so that the first fire extinguishing member is ordinarily maintained in the capsulated shape, whereas the first fire extinguishing member is scattered into the electrolyte while the capsule is melted when the electrode assembly increase in temperature to suppress the increase in temperature of the electrode assembly.

Third: in the secondary battery according to the present invention, the insulation member and the first fire extinguishing member may have the two-layered structure to suppress the increase in temperature of the electrode assembly while improving the insulation.

Fourth: in the secondary battery according to the present invention, the insulation member and the first fire extinguishing member may be integrated with each other to increase in thickness, thereby realizing the easiness in installation.

MODE FOR CARRYING OUT THE INVENTION

Figure 1:
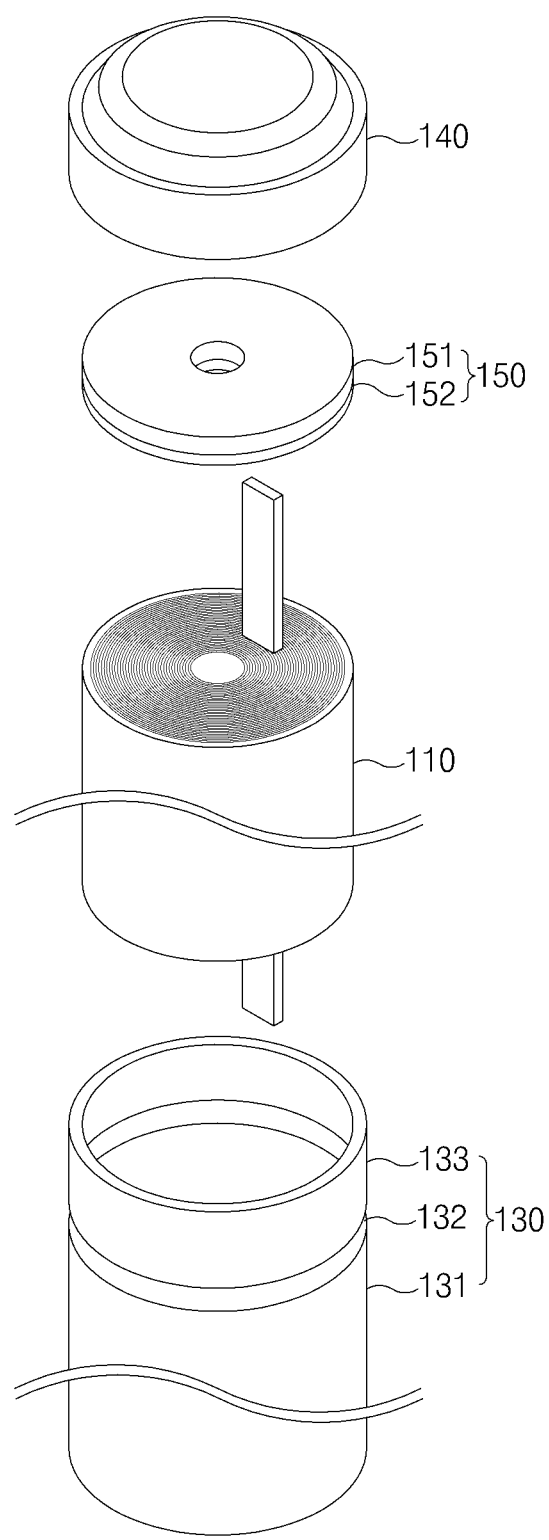
FIG. 1 is a perspective view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

First Embodiment of the Present Invention

As illustrated in FIG. 1, a secondary battery according to a first embodiment of the present invention may be improved in safety by suppressing an increase in temperature of an electrode assembly. The secondary battery includes an electrode assembly 110, an electrolyte 120, a can 130 in which the electrode assembly 110 and the electrolyte 120 are accommodated, a cap assembly 140 mounted on an opening 133 of the can 130, and a safety assembly 150 that suppresses the increase in temperature of the electrode assembly 110.

The electrode assembly 110 has a structure in which a plurality of electrodes and a plurality of separators are alternately stacked. Also, the plurality of electrodes may be provided with a positive electrode and a negative electrode. A positive electrode tab is provided on the positive electrode, and a negative electrode tab is provided on the negative electrode.

The electrolyte 120 may be configured to improve performance of the electrode assembly and be accommodated together with the electrode assembly 110 in the can 130.

The can 130 includes an accommodation part 131 accommodating the electrode assembly 110 and the electrolyte 120, a beading part 132 disposed on the accommodation part 131, having a diameter less than that of the accommodation part 131, and supporting the cap assembly 140, and the opening 133 which is defined in an upper portion of the beading part 132 and on which the cap assembly 140 is mounted.

The cap assembly 140 may be mounted on the opening 133 of the can 130 and connected to the positive electrode tab of the electrode assembly 110 to form a positive electrode terminal. The negative electrode tab of the electrode assembly 110 may be connected to a bottom surface of the can 130 to form a negative electrode terminal.

Figure 2:
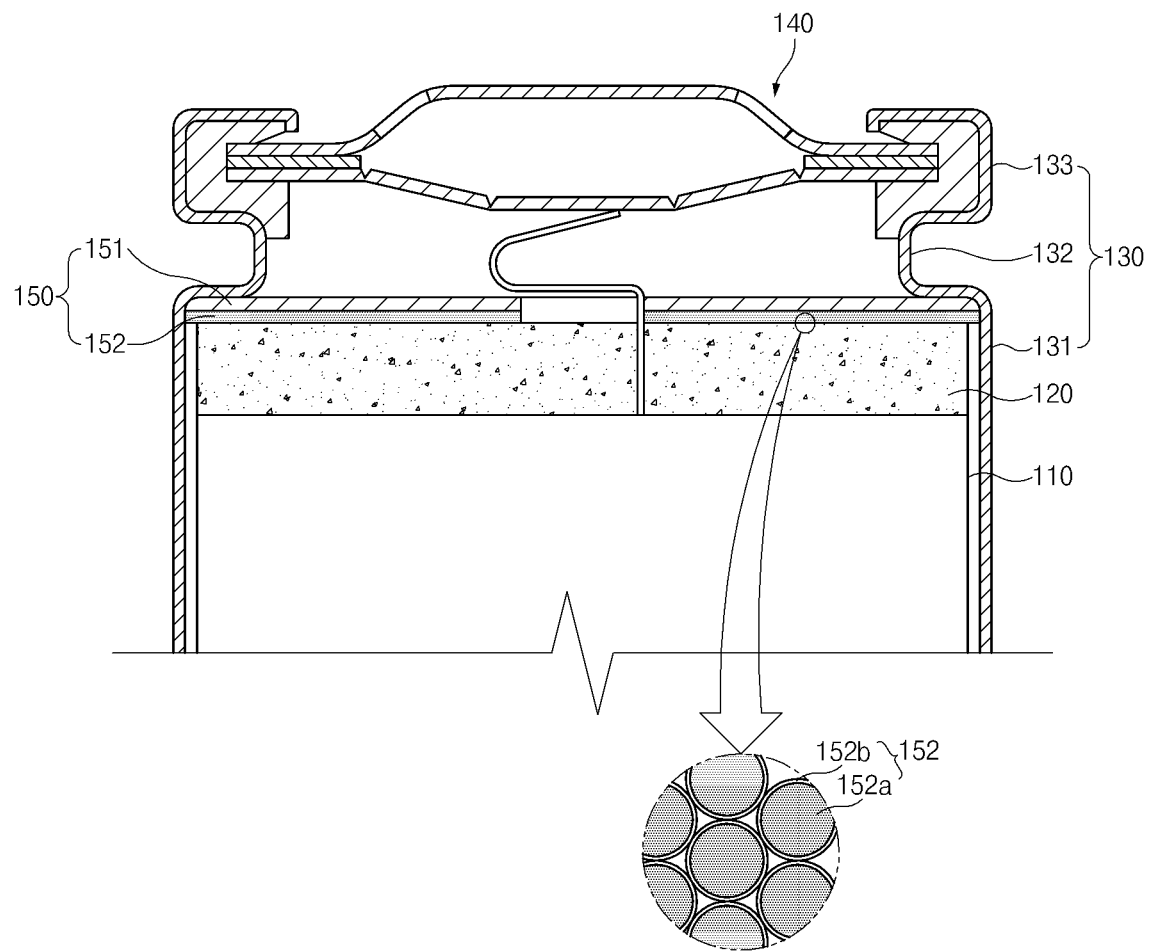
FIG. 2 is a cross-sectional view of the secondary battery according to the first embodiment of the present invention.

As illustrated in FIG. 2, the safety assembly 150 may be configured to suppress an increase in temperature of the electrode assembly, preventing heat generation, ignition, and explosion from occurring. The safety assembly 150 includes an insulation member 151 disposed between the electrode assembly 110 and the cap assembly 140 to insulate the electrode assembly 110 from the cap assembly 140 and a first fire extinguishing member 152 installed on the insulation member 151 to suppress the increase in temperature of the electrode assembly 110 by being scattered into the electrolyte 120 when the electrode assembly 110 increases in temperature.

The insulation member 151 may be configured to insulation the electrode assembly 110 and the cap assembly 140 from each other and be made of a material having insulation. That is, the insulation member has a donut-shaped plate shape with a through-hole at a center thereof and is made of a hard synthetic resin material such as polyvinylchloride (PVC) or polypropylene (PP).

The first fire extinguishing member 152 is provided with a plurality of capsulated fire-extinguishing grains. Each of the capsulated fire-extinguishing grains include a fire extinguishing liquid 152a and a capsule 152b containing the fire extinguishing liquid 152a. The capsule 152b is made of a material that is melted at a predetermined temperature.

That is, in the first fire extinguishing member 152 provided as the capsulated fire-extinguishing grains, when the electrode assembly 110 increases in temperature, the capsule 152b may be melted by heat transferred from the electrode assembly 110. Thus, the fire extinguishing liquid 152a contained in the capsule 152b may be scattered into the electrolyte 120 while the capsule 152b is melted, and then, the fire extinguishing liquid 152a scattered into the electrolyte 120 may be absorbed to the electrode assembly 110 to suppress the increase in temperature.

The capsule 152b may be made of a material having a melting point less than those of the generated heat, the ignition, and the explosion of the electrode assembly 110. Thus, the electrode assembly 110 may be prevented from increasing in temperature by the fire extinguishing liquid 152a while the capsule 152b is melted before the heat generation, the ignition, and the explosion of the electrode assembly 100.

As described above, the first fire extinguishing member 152 may effectively suppress the increase in temperature of the electrode assembly 110 to prevent the heat generation, the ignition, and the explosion of the electrode assembly 110 from occurring.

As illustrated in FIG. 2, the insulation member 151 and the first fire extinguishing member 152 have a two-layered structure. That is, the insulation member 151 and the first fire extinguishing member 152 may be vertically stacked to form the two-layered structure. Thus, the insulation member 151 disposed at an upper side may improve insulation, and the first fire extinguishing member 152 disposed at a lower side may suppress the increase in temperature of the electrode assembly 110. Particularly, since the insulation member 151 and the first fire extinguishing member 152 are commercialized into the two-layered structure to improve use's convenience and efficiency.

The fire extinguishing liquid 152a has a component including perfluoroketone. That is, the perfluoroketone is also referred to as "non-wetting water" and has almost the same colorless, odorless, and viscous as water. Also, the perfluoroketone has density greater 1.7 times than that of water, does not conduct electricity, does not react with a contacted material, and has a boiling point of 40° C. Particularly, since the perflurooketone has a high vaporization rate, damage of the product is less even after the fire is extinguished.

The secondary battery according to the first embodiment of the present invention may include the safety assembly 150 to effectively suppress the increase in temperature of the electrode assembly 110 and improve the safety.

Hereinafter, in description of a secondary battery according to another embodiment of the present invention, constituents having the same configuration and function have been given with the same reference numeral in the drawings, and thus their duplicated descriptions will be omitted.

Second Embodiment of the Present Invention

Figure 3:
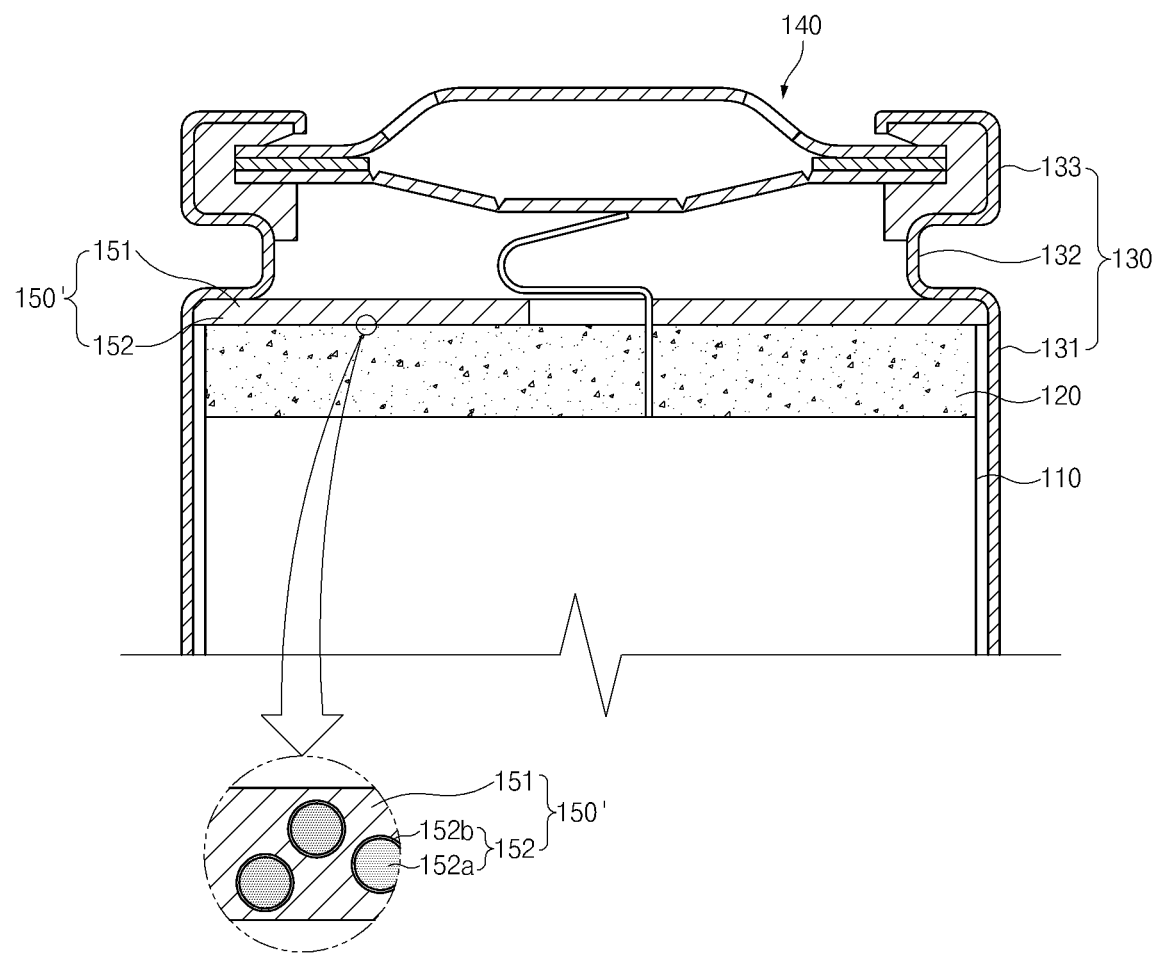
FIG. 3 is a cross-sectional view of a secondary battery according to a second embodiment of the present invention.

As illustrated in FIG. 3, a secondary battery according to a second embodiment of the present invention includes a safety assembly 150'. The safety assembly 150' includes an insulation member 151 and a first fire extinguishing member 152, which are integrated with each other.

That is, the insulation member 151 is made of a material having innumerable holes or gaps in a surface thereof, and the first fire extinguishing member 152 is provided with innumerable capsulated fire-extinguishing grains that are filled into the holes or gaps of the insulation member 151.

Thus, the safety assembly 150' has an integrated structure because the first fire extinguishing member 152 that is provided with the capsulated fire-extinguishing grains is filled into the holes or gaps formed in the insulation member 151.

The secondary battery according to the second embodiment of the present invention may include the safety assembly 150' in which the insulation member 151 and the first fire extinguishing member 152 are integrated with each other to improve the coupling between the insulation member 151 and the first fire extinguishing member 152 and user's convenience.

Third Embodiment of the Present Invention

Figure 4:
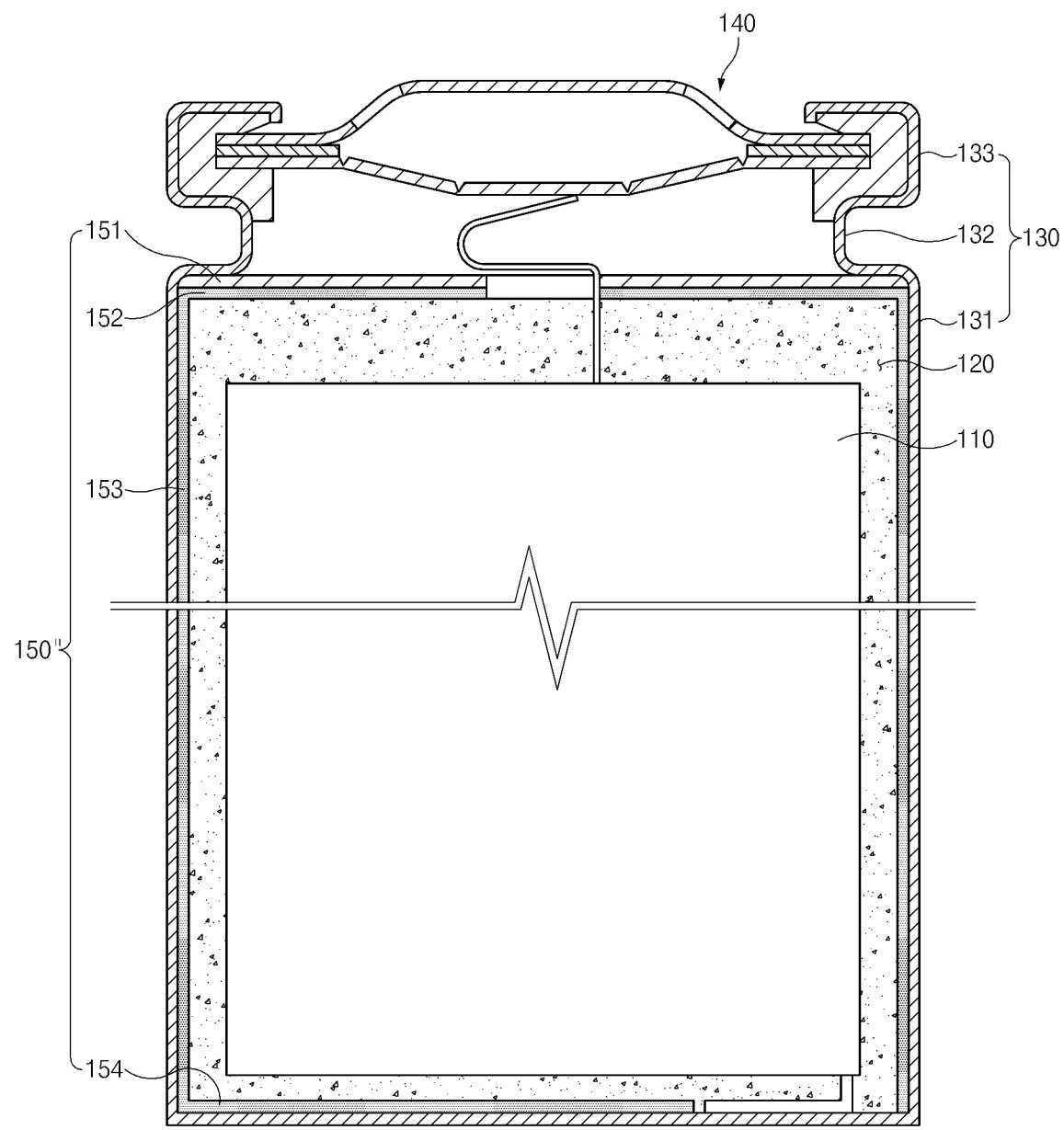
FIG. 4 is a cross-sectional view of a secondary battery according to a third embodiment of the present invention.

As illustrated in FIG. 4, a secondary battery according to a third embodiment of the present invention includes a safety assembly 150". The safety assembly 150" further includes a second fire extinguishing member 153 disposed between an electrode assembly 110 and a bottom surface of a can 130 to suppress an increase in temperature of the electrode assembly 110 while being scattered into an electrolyte when the electrode assembly 110 increases in temperature. The second fire extinguishing member 153 is provided with a plurality of capsulated fire-extinguishing grains containing the same fire extinguishing liquid as the first fire extinguishing member 152.

Here, the plurality of capsulated fire-extinguishing grains that are the second fire extinguishing member 153 may be attached to the bottom surface of the can 130 by using an adhesive (not shown). The second fire extinguishing member 153 may be stably fixed to the bottom surface of the can 130.

As described above, in the secondary battery according to the third embodiment of the present invention, the increase in temperature of the electrode assembly 110 may be suppressed through the first fire extinguishing member 152, and an increase in temperature of a lower portion of the electrode assembly 110 may be suppressed through the second fire extinguishing member 153 to more improve the safety.

The safety assembly 150" may further include a third fire extinguishing member 154 disposed on an inner circumferential surface of the can 130 to suppress the increase in temperature of the electrode assembly 110 while being scattered into the electrolyte 120 when the electrode assembly 110 increases in temperature. The third fire extinguishing member 154 is provided with a plurality of capsulated fire-extinguishing grains containing the same fire extinguishing liquid as the first fire extinguishing member 152.

Here, the plurality of capsulated fire-extinguishing grains that are the third fire extinguishing member 154 may be attached to the inner circumferential surface of the can 130 by using an adhesive (not shown). The third fire extinguishing member 154 may be stably fixed to the inner circumferential surface of the can 130.

As described above, in the secondary battery according to the third embodiment of the present invention, the increase in temperature of a side portion of the electrode assembly 110 may be suppressed through the third fire extinguishing member 154 to more improve the safety.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
a can having an opening in which an electrode assembly and an electrolyte are accommodated;
a cap assembly mounted on the opening of the can; and
a safety assembly disposed in a region located between the electrode assembly and the cap assembly, the safety assembly comprising an insulation member and comprising a first fire extinguishing member that is configured to be scattered into the electrolyte when the electrode assembly experiences an increase in temperature to suppress the increase in temperature of the electrode assembly;
wherein the insulation member has opposing top and bottom surfaces, the insulation member having holes or gaps extending into the insulation member between the top and bottom surfaces such that the holes or gaps are each surrounded by material of the insulation member on multiple sides, and
wherein the first fire extinguishing member includes a plurality of capsulated fire-extinguishing grains containing a fire extinguishing liquid, the plurality of capsulated fire-extinguishing grains configured to be melted when the electrode assembly experiences the increase in temperature so that the fire extinguishing liquid is scattered into the electrolyte, and the plurality of capsulated fire-extinguishing grains being filled into the holes or gaps of the insulation member to provide a structure in which the insulation member and the first fire extinguishing member are integrated with each other, the plurality of capsulated fire-extinguishing grains being distributed in the insulation member such that portions of the material of the insulation member are defined between the grains.

2. The secondary battery of claim 1, wherein the fire extinguishing liquid has a component including perfluoroketone.

3. The secondary battery of claim 1, wherein the can comprises an accommodation part accommodating the electrode assembly and the electrolyte, a beading part supporting the cap assembly, and the opening on which the cap assembly is mounted, and the safety assembly is disposed in the accommodation part and has an edge attached to a bottom surface of the beading part.

4. The secondary battery of claim 1, wherein the safety assembly further comprises a second fire extinguishing member disposed between the electrode assembly and a bottom surface of the can, the second fire extinguishing member being configured to suppress the increase in temperature of the electrode assembly while being scattered into the electrolyte when the electrode assembly experiences the increase in temperature, and the second fire extinguishing member includes a plurality of second capsulated fire-extinguishing grains containing the fire extinguishing liquid.

5. The secondary battery of claim 4, wherein the plurality of second capsulated fire-extinguishing grains is attached to the bottom surface of the can by an adhesive.

6. The secondary battery of claim 1, wherein the safety assembly further comprises an additional fire extinguishing member disposed on an inner circumferential surface of the can, the additional fire extinguishing member being configured to suppress the increase in temperature of the electrode assembly while being scattered into the electrolyte when the electrode assembly experiences the increase in temperature, and the additional fire extinguishing member includes a plurality of second capsulated fire-extinguishing grains containing the fire extinguishing liquid.

7. The secondary battery of claim 6, wherein the plurality of second capsulated fire-extinguishing grains is attached to the inner circumferential surface of the can by an adhesive.

8. The secondary battery of claim 1, wherein the insulation member is made of a polyvinylchloride (PVC) or polypropylene (PP) material.

9. The secondary battery of claim 1, wherein the capsulated fire-extinguishing grains are shaped uniformly to one another.

10. The secondary battery of claim 1, wherein each of the capsulated fire-extinguishing grains has a circular cross-section.

11. The secondary battery of claim 1, wherein each of the capsulated fire-extinguishing grains has the shape of a spheroid.

* * * * *